US010558704B2

(12) United States Patent
Zhou et al.

(10) Patent No.: US 10,558,704 B2
(45) Date of Patent: Feb. 11, 2020

(54) SMART ROLLOVER

(71) Applicant: SAP SE, Walldorf (DE)

(72) Inventors: Panfeng Zhou, Dublin, CA (US); Mihnea Andrei, Issy las Moulineaux (FR); Vivek Kandiyanallur, San Jose, CA (US); Xin Liu, San Ramon, CA (US); Neeraj Kulkarni, Pune (IN)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 15/692,267

(22) Filed: Aug. 31, 2017

(65) Prior Publication Data

US 2019/0026387 A1 Jan. 24, 2019

(30) Foreign Application Priority Data

Jul. 20, 2017 (IN) ............................ 201741025820

(51) Int. Cl.

*G06F 16/00* (2019.01)
*G06F 16/835* (2019.01)
*G06F 16/84* (2019.01)
*G06F 16/25* (2019.01)
*G06F 16/174* (2019.01)
*G06F 16/21* (2019.01)
*G06F 16/90* (2019.01)
*G06F 16/907* (2019.01)

(52) U.S. Cl.

CPC ........ *G06F 16/835* (2019.01); *G06F 16/1744* (2019.01); *G06F 16/21* (2019.01); *G06F 16/258* (2019.01); *G06F 16/86* (2019.01); *G06F 16/90* (2019.01); *G06F 16/907* (2019.01)

(58) Field of Classification Search

CPC ........ G06F 16/835; G06F 16/21; G06F 16/86; G06F 16/1744; G06F 16/258; G06F 16/90; G06F 16/907; G06F 16/337; G06F 21/10; G06F 2221/2113; G06F 16/2462; G06F 16/9014; G06F 16/2455; G06F 16/9026; G06F 16/3347; G06F 16/24575; G06F 16/1756; G06F 3/0604; G06F 3/064; G06F 3/0673; G06F 17/30587; G06F 3/0608; G06F 16/1748; G06F 17/30613; G06F 17/30348; G06F 17/30315; G06F 3/065; G06Q 50/01; G06Q 10/00

See application file for complete search history.

(56) References Cited

U.S. PATENT DOCUMENTS 3,701,111 A * 10/1972 Cocke ................ H03M 7/4025 341/67
5,600,726 A * 2/1997 Morgan ................ H03M 7/30 380/28
9,565,105 B2 * 2/2017 Kapadia ................ H04L 45/745

(Continued)

*Primary Examiner* — Anh Ly

(74) *Attorney, Agent, or Firm* — Buckley, Maschoff & Talwalkar LLC

(57) ABSTRACT

A system and method, including determining, by a processor, a data type for each column of a database table; determining, by the processor and based on the determined data type for each column of the database table, an indication of a size of the database table; calculating, by the processor and based on the determined indication of the size of the database table, a start nbit size for a nbit compression process to be used on the database table; specifying, by the processor, the calculated start nbit size for the nbit compression process; and compressing the database table by executing the nbit data compression process using the specified start nbit size.

15 Claims, 5 Drawing Sheets

500

DETERMINE A DATA TYPE FOR EACH COLUMN OF A DATABASE TABLE 505

DETERMINE, BASED ON THE DETERMINED DATA TYPE FOR EACH COLUMN OF THE DATABASE TABLE, AN INDICATION OF A SIZE OF THE DATABASE TABLE 510

CALCULATE, BASED ON THE DETERMINED INDICATION OF THE SIZE OF THE DATABASE TABLE, A START nBIT SIZE FOR A nBIT COMPRESSION PROCESS TO BE USED ON THE DATABASE TABLE 515

SPECIFY, BY THE PROCESSOR, THE CALCULATED START nBITSIZE FOR THE nBIT COMPRESSION PROCESS 520

COMPRESS THE DATABASE TABLE BY EXECUTING THE nBIT DATA COMPRESSION PROCESS USING THE SPECIFIED START nBIT SIZE 525

(56) References Cited

U.S. PATENT DOCUMENTS

2005/0114063 A1* 5/2005 Terauchi ................ G11C 29/26 702/117
2008/0071748 A1* 3/2008 Wroblewski ............ H03M 7/30
2009/0063068 A1* 3/2009 Cassels ................ G01R 13/029 702/65
2009/0164711 A1* 6/2009 Niwa ..................... G11C 16/10 711/103
2011/0173164 A1* 7/2011 Bendel .............. G06F 16/24561 707/693
2012/0126851 A1* 5/2012 Kelem ................ G06F 15/7867 326/38
2013/0099947 A1* 4/2013 Dickie ................ H03M 7/4037 341/59
2014/0052726 A1* 2/2014 Amberg ................ G06F 16/244 707/737
2014/0115401 A1* 4/2014 Ito ....................... G06F 11/1641 714/37
2014/0369680 A1* 12/2014 Oveis Gharan ....... H04L 1/0042 398/27
2015/0063353 A1* 3/2015 Kapadia ................ H04L 45/745 370/392
2016/0098047 A1* 4/2016 Abhishek ................ G05F 1/462 327/307
2016/0147447 A1* 5/2016 Blanco .................... G06F 16/28 711/154
2016/0147801 A1* 5/2016 Wein ..................... G06F 16/221 707/609
2016/0147814 A1* 5/2016 Goel ................... G06F 16/2358 707/600

* cited by examiner

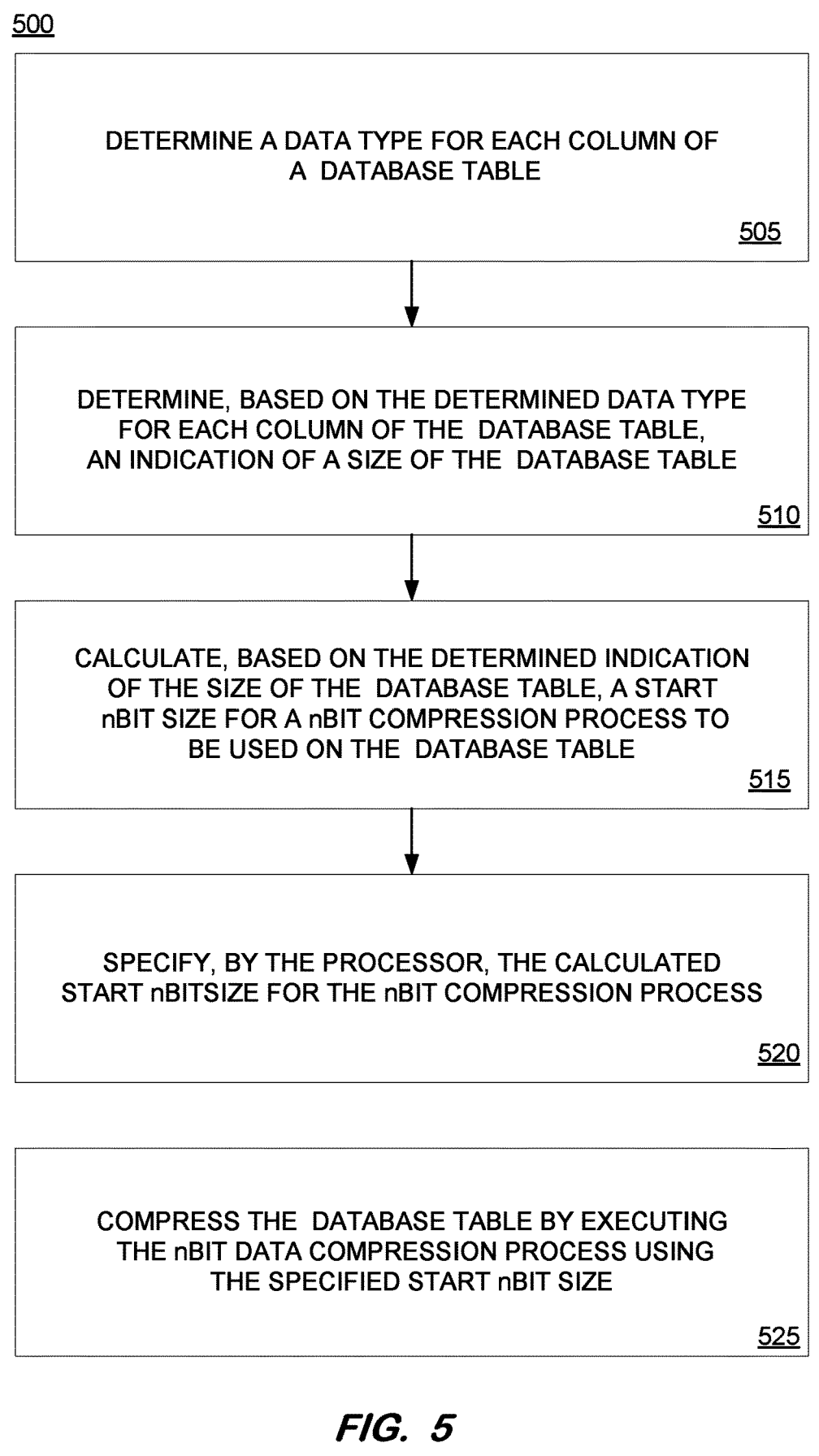

500

DETERMINE A DATA TYPE FOR EACH COLUMN OF A DATABASE TABLE
505

DETERMINE, BASED ON THE DETERMINED DATA TYPE FOR EACH COLUMN OF THE DATABASE TABLE, AN INDICATION OF A SIZE OF THE DATABASE TABLE
510

CALCULATE, BASED ON THE DETERMINED INDICATION OF THE SIZE OF THE DATABASE TABLE, A START nBIT SIZE FOR A nBIT COMPRESSION PROCESS TO BE USED ON THE DATABASE TABLE
515

SPECIFY, BY THE PROCESSOR, THE CALCULATED START nBITSIZE FOR THE nBIT COMPRESSION PROCESS
520

COMPRESS THE DATABASE TABLE BY EXECUTING THE nBIT DATA COMPRESSION PROCESS USING THE SPECIFIED START nBIT SIZE
525

*FIG. 5*

SMART ROLLOVER

BACKGROUND

A database management system may include data in many thousands and even millions of data tables. The organization and management of the many tables and other data structures requires many coordinated efforts and resources. Oftentimes, there is an on-going concern about providing a fast performance in a reliable manner. That is, a balance might have to be maintained between performing task(s) fast and performing the same or other tasks in an efficient manner. Additionally, a cost, in terms of systems resources and time required to perform the task(s) may be a consideration and/or concern.

In some contexts, there may exist a desire to more efficiently perform data compression operations, while conserving system resources.

BRIEF DESCRIPTION OF THE DRAWINGS

FIG. 5 is a flow diagram of a process in an example embodiment; and

DETAILED DESCRIPTION

The following description is provided to enable any person in the art to make and use the described embodiments. Various modifications, however, will remain readily apparent to those in the art.

Figure 1:
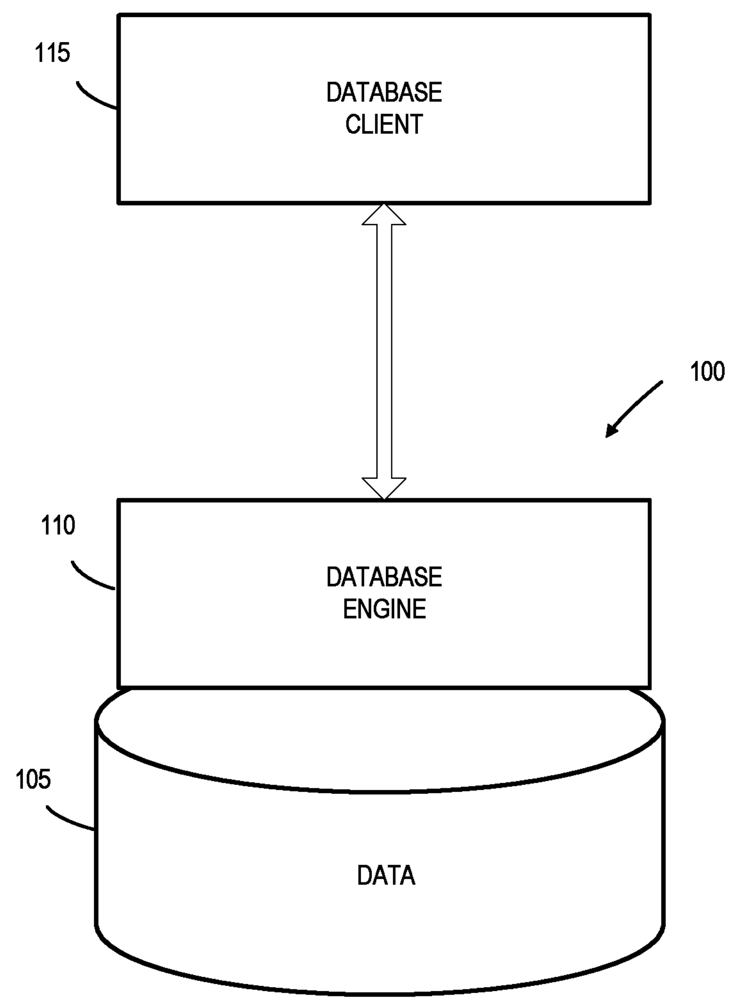
FIG. 1 is an illustrative block diagram of an example database system.

FIG. 1 is a block diagram of database system 100 according to some embodiments. FIG. 1 represents a logical architecture for describing systems according to some embodiments, and actual implementations may include more or different components arranged in other manners.

Database system 100 may comprise any query-responsive data source or sources that are or become known, including but not limited to a structured-query language (SQL) relational database management system. Database system 100 may comprise a relational database, a multi-dimensional database, an eXtendable Markup Language (XML) document, or any other data storage system storing structured and/or unstructured data. Data 105 of database 100 may be distributed among several relational databases, multi-dimensional databases, and/or other data sources. Embodiments are not limited to any number or types of data sources.

Database 100 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Database 100 may store metadata regarding the structure, relationships and meaning of data 105. This information may include data defining the schema of database tables stored within data 105. A database table schema may specify the name of the database table, columns of the database table, the data type associated with each column, and other information associated with the database table.

Database 100 may also or alternatively support multi-tenancy by providing multiple logical database systems which are programmatically isolated from one another. Moreover, data 105 may be indexed and/or selectively replicated in an index to allow fast searching and retrieval thereof.

Database engine 110 performs administrative and management functions for database 100. Such functions may include snapshot and backup management, indexing, optimization, garbage collection, and/or any other database functions that are or become known. Database engine 110 may also implement a query engine for receiving queries from database client 115, retrieving data from data 105 based on the queries, and transmitting a query result back to database client 115.

Database client 115 may comprise one or more devices executing program code of a software application for presenting user interfaces to allow interaction with database system 100. For example, a user may manipulate such user interfaces to request particular data (e.g., for populating a spreadsheet, a graph, etc.). In response, client 115 executes program code of a software application to generate a query (e.g., a structured-query language (SQL) query) identifying the requested data, and to transmit the query to database engine 110.

In some embodiments, data stored in a database system (e.g., 100) might encode/compressed according to a particular compression process. In some embodiments, a database system herein may include an in-memory database system such as, for example, SAP HANA developed and owned by the assignee of the present disclosure. In some embodiments, the database may use an nbit data compression process to encode data and store it in main memory. The nbit compression of the data can significantly reduce the memory footprint for the database.

Figure 2:
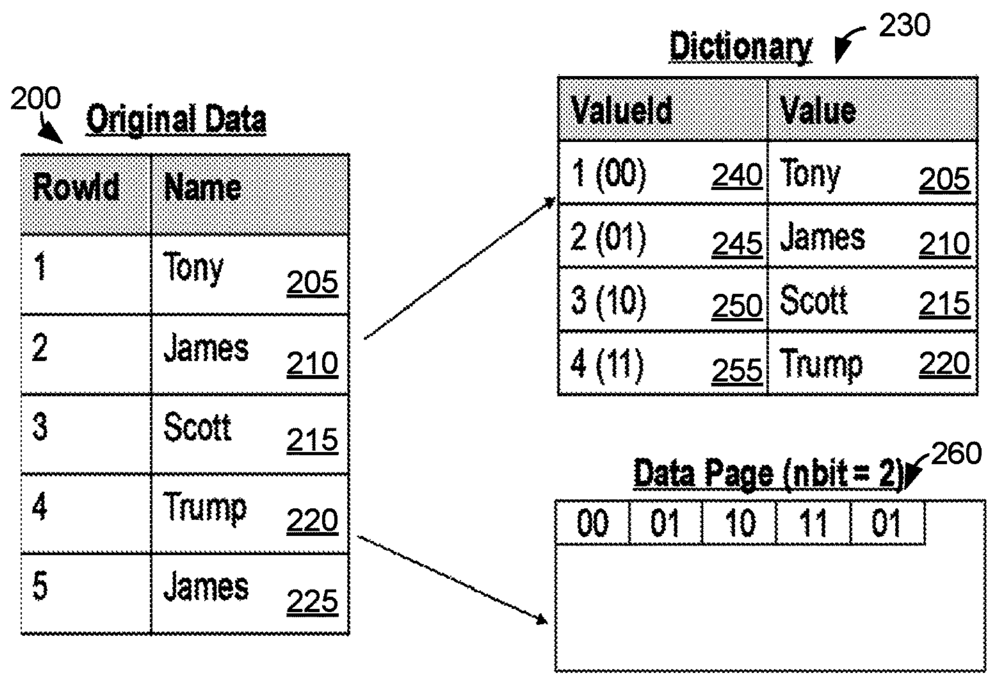
FIG. 2 is an illustrative depiction of example tables of a database system.

The nbit compression uses n bits to index a dictionary where the data is stored. Referring to FIG. 2, database tables representative of example data and the storage thereof in a database system are shown. In the example of FIG. 2, nbit compression is applied to all of the columns of the original data in table 200. The compression process includes mapping the unique column values to consecutive numbers. As illustrated by dictionary table 230, the unique values in data table 200 (i.e., Tony 205, James 210, Scott 215, and Trump 220) are mapped to consecutive numbers. There are four distinct, unique values in table 200. Accordingly, nbit size=2 is sufficient to represent the 4 unique data values (e.g., 2 unique values need 1 bit, 4 unique values need 2 bits, 8 unique values require 3 bits, etc.). As seen in FIG. 2 at dictionary 230, Tony is mapped to "00" (240), James is mapped to 01" (245), Scott is mapped to "10" (250), and Trump is mapped to "11" (255). It is noted that James 225 is not unique, it is a duplicate of James 210, and is therefore not indexed in dictionary table 230. Data page 260 only stores the data bit values representing data, instead of storing the actual data values. As such, only 10 bits are required to fully represent the data (i.e., 5 rows) of data table 200.

In some aspects, as additional unique values are inserted in a data table, then more bits are required to represent the data values thereof. For example, when the nbit size changes (e.g., 2 to 3) due to more data values being inserted into a table, the data in the old data page (i.e., nbit=2) is no longer valid. A new data page with the new nbit size (e.g., 3 bits) needs to be created. The process of creating a new data page, copying data from the old data page to the new data page and de-allocating the old data page is referred to as a rollover operation or process.

Figure 3:
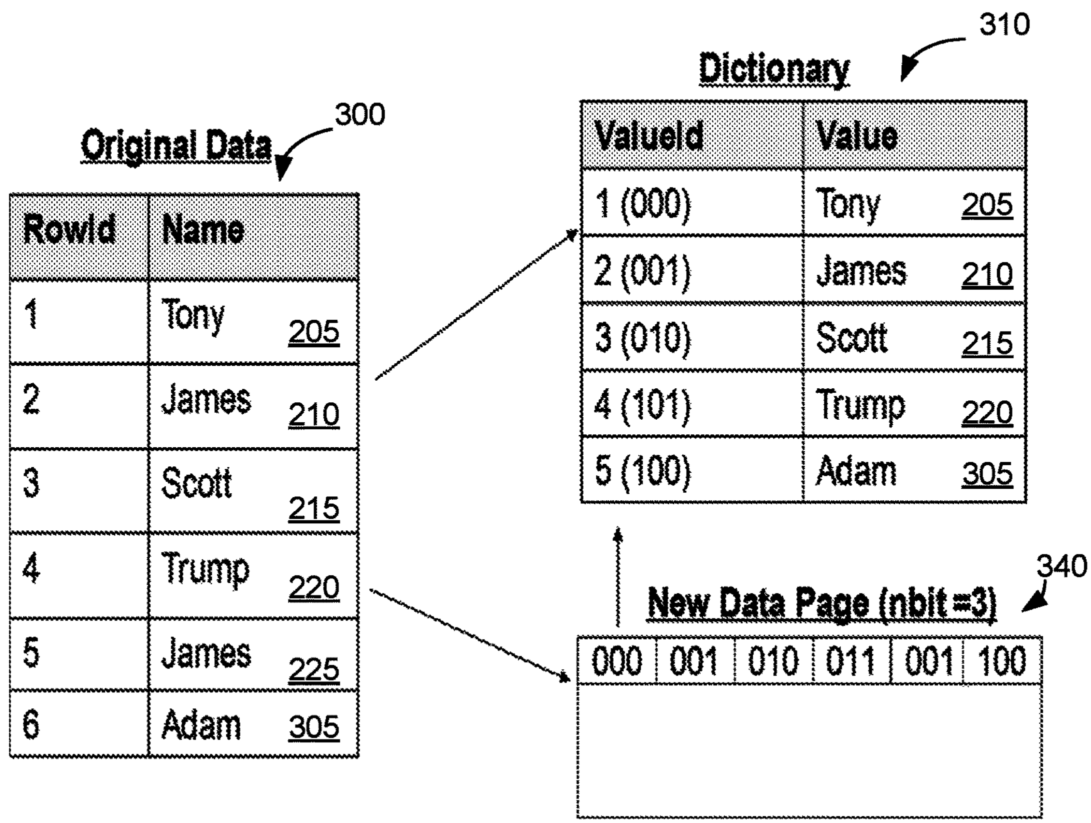
FIG. 3 is an illustrative depiction of example tables diagram of a database system.

FIG. 3 illustrates some aspects of a rollover process. Data table 300 is a continuation of the example of FIG. 2. In particular, the data value of Adam is added to the previous version of the data. As such, table 300 includes 5 unique values. While 2 bits were initially used to store the data since the data only included 4 unique values, the current 5 unique values cannot be fully represented by 2 bits. As such, additional bits are needed. The nbit size is increased to 3 to accommodate the 5 distinct values. Dictionary 310 illustrates the mapping of the 5 unique values, including the newly added data value of Adam (305). Since the nbit size changed (i.e., 2 to 3), a new data page 340 is created by copying the old data to the new data page, transferring data from 2 bits to 3 bits, de-allocating the old data page 260. As such, it is seen that a rollover operation is relatively expensive and complicated.

In some regards, reducing the number of rollovers performed by a database system might improve the performance and stability of the system. As an example, it is not uncommon for a database system to include 80,000-90,000 tables and each table may experience or have rollovers due to nbit encoded/compressed implementation(s). Therefore, a system undergoing tens of thousands and even millions of rollover operations is not unheard of. Rollover operations are not cheap to execute and the vast number of rollovers in a system may cause some problems, including but not limited to a system slowdown and/or error/bugs in system.

In some embodiments, the present disclosure includes a configurable rollover process. The configurable rollover process provides a mechanism for a user to specify a start nbit size. The specifying of a start nbit size provides, in some aspects, a technology-based solution to reduce the number of rollovers performed/executed by a database system.

In some regards, a user might have insight and/or knowledge of their database system. For example, a user may know that their database system primarily includes smaller tables that can be represented by 8 bits. In some instances, knowledge of the data may be obtained through an analysis, some reporting, and other automatic, manual, and a combination thereof processes. Importantly, the knowledge (for example, typical size of tables) of the data being stored is factually based and can be represented, at least to some extent, statistically.

In some embodiments, a user may specify a start nbit size, in an effort to reduce the number of rollover operations performed by a system. In some instances, a larger nbit start size may be specified. By establishing data pages with a larger or bigger start nbit, rollover operations invoked by small(er) nbit values can be avoided.

However, care should be exercised in determining the start nbit size since using more bits than necessary in representing data being stored is itself wasteful of system resources. For example, representing each of four unique data values using 32 bits when 2 bits would suffice is costly. While a number of rollover operations may be avoided (e.g., changes from 1 to 2; 2 to 3, etc.), if the data indicates that a much smaller nbit size is realistic and reasonable given the type of data being stored, then use of a smaller nbit size is prudent. Again, a data-driven factual or statistical basis for specifying the start nbit size can be used in some embodiments herein.

In one embodiment, a bigger/larger start nbit size may be specified based on system statistics information (e.g., number of tables, typical number of columns and rows in the stored data, etc.). In one implementation, two hidden parameters can be set in a database system configuration file. For example, a configuration file indexserver.ini might include two parameters:

```
-[indexing] use__smart__rollover = true # default: false
-[indexing] magic__start__rollover__nbit = xx #default: 8
(if use__smart__rollover = true),
```

where if the user uses a new "smart rollover" feature then they can specify the start nbit size, otherwise a "default" start nbit size can be used.

As an example,

```
•     Default:
rowPos 1025, m__RolloverVersion 11
•     use__smart__rollover = true (nbit = 8)
rowPos 1025, m__RolloverVersion 4
•     magic__start__rollover__nbit = 11
rowPos 1025, m__RolloverVersion 1
```

As an example using illustrative numbers, a typical ERP (Enterprise Resource Planning) system may include 90,000 tables, where we know ⅓ (30K) of the tables might be empty, ⅓ (30K) of the tables may be small tables (i.e., <1000 rows), and ⅓ (30K) of the tables might be big tables (i.e., >1000 rows). For this scenario, the configurable, smart rollover feature(s) herein can reduce the number of rollovers for the small tables and big tables, at least in their initial stages. In this example, about 9.6 million rollovers can be reduced (e.g., 60K (including the 30K small tables and the 30K large tables)*8 (i.e., set aside 8 bits per table)*20 (i.e., 20 columns per table) for small insert. It is noted that no savings are realized for the 30K empty tables since no data is associated with these tables. In some regards, the start nbit size should be selected and specified wisely (i.e., based on specific, factual information regarding the data in the database system).

Figure 4:
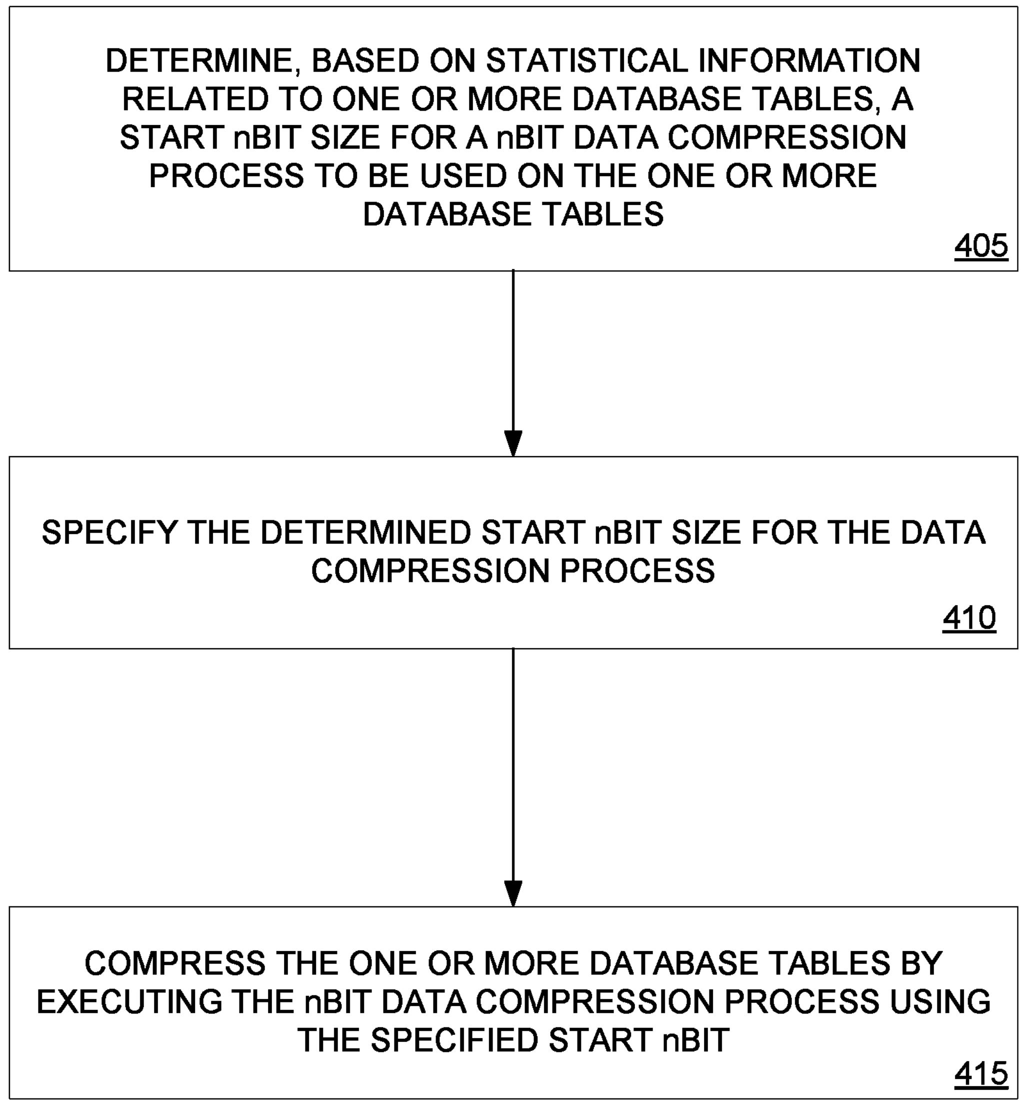
FIG. 4 is a flow diagram of a process in an example embodiment.

Referring to FIG. 4, a flow diagram for a process 400 is depicted. At operation 405, a determination is made, based on statistical information related to one or more database tables of a database system. The statistical information is evaluated to determine a start nbit size for a nbit data compression process to be used on the one or more database tables.

At operation 410, the determined start nbit size for the data compression process to use is specified to the system. In some instances, a default nbit size may be specified in the absence of particular size from a user. Continuing to operation 415, the one or more database tables can be compressed using the specified start nbit size. As discussed above, use of a configurable start nbit size can reduce the number of rollover operations.

As demonstrated by the example above, the same nbit size was used for all of the tables (90K) in a database system. However, one fixed nbit size might not be optimal or even a best choice for all of the tables in a database system. In some embodiments herein, a process includes determining and specifying a start nbit size for each table. In this manner, the start nbit might be optimized for each table, at least to an extent. Desirably, the process is intelligent enough to self-adjust based on a table's specification. Database tables are created based on a specification or definition for the columns comprising the table. The definition might specify the types of data to be included in the different columns of the table, as well as other parameters. For example, the definition might specify that column 1 be an integer, column 2 might be a text string, column 3 is a Boolean value, etc.

In some regards, a process herein may begin with an initialization of a rowsize indicator or counter (e.g., expect_rowsize=0). Thereafter, a data type for each column in the subject data tables is determined or otherwise ascertained based on the table's definition. For example, the process can loop each column and check the data type of each column. As an example, the expect_rowsize parameter might be adjusted based on the data type specified in the definition for each column. The following illustrates one embodiment.

```
{
    case boolean: expected_rowsize +=1;
    case explicit identity column : expected_rowsize
    +=0;
    case aux column (e.g., text, lob, geo,etc):
    expected_rowsize +=64;
    case transient column (e.g., concat):
    expected_rowsize +=0;
    default: expected_rowsize
+=MAGIC_START_ROLLOVER_NBIT (e.g., =8);
}
expect_rowsize_bytes = expect_rowsize/8;
```

In the instance the data type is Boolean, then the rowsize is increased by 1 since only 1 bit is needed to represent the two possibilities. For the "explicit identity" data type, there are no duplicate values. As such, the value for the explicit identity data type can be maintained in the compression dictionary, without a need to have an entry in a stored data page. Accordingly, this type of data type does not change the value for the expected_rowsize.

The "aux column" data type of column is specific to HANA SAP. As such, the value this data type represents can be a fixed number. In the present example, the expected_rowsize is set to 64 bits (i.e., 8 bytes) and only stores a pointer to outside file(s). This data type illustrates how the present disclosure and processes can accommodate different data types, including for example, user-defined data types, specific system parameters, etc.

The "transient column" data type may refer to notes stored in a data page and is constructed on-the-fly (hence its name). For all other column data types, the process, as outlined above, will use a default nbit size as controlled by process (e.g., bits=8).

After each column is processed, the expected rowsize is calculated in terms of bytes, as opposed to the previous expression in bits. Namely, expect_rowsize_bytes=expect_rowsize/8.

Continuing with the process, a determination is made to calculate how many rows can be stored on a first page (i.e., before a first rollover operation is needed, given each page is 4K in size). For example:

```
expect_rows_per_page = 4K/expected_rowsize_bytes
If expect_rows_per_page >= 2^MAGIC_START_ROLLOVER_NBIT
(e.g., = 8)
{
    startNbit = MAGIC_START_ROLLOVER_NBIT; //For this
table, we can at least store 256 rows in the 1st page (4KB).
}
else
{
    startNbit = log2 (expect_rows_per_page);
}
```

Based on the foregoing, the start nbit will always be less than or equal to MAGIC_START_ROLLOVER_NBIT (8 bits).

FIG. 5 is a flow diagram of a process 500 that in some aspects corresponds to the foregoing example. In particular, process 500 may include an initialization step, although not specifically shown in FIG. 5. At operation 505, a determination is performed regarding a data type for each column of a database table. Process 500 is performed for each table subject to being compressed/encoded.

At operation 510, the process includes determining, based on the determined data type for each column of the database table, an indication of a size of the database table. This calculation may be expressed in bits. The bits expression may further be converted to bytes to agree with the data page sizes of the database system.

Operation 515 includes calculating, based on the determined indication of the size of the database table, a start nbit size for a nbit compression process to be used on the database table. In some aspects, the nbit size may be a default size or a further refined size. Operations 520 and 525 include, respectively, specifying the calculated start nbit size for the nbit compression process and compressing the database table by executing the nbit data compression process using the specified start nbit size. Process 500 may be performed for each table in a database.

Figure 6:
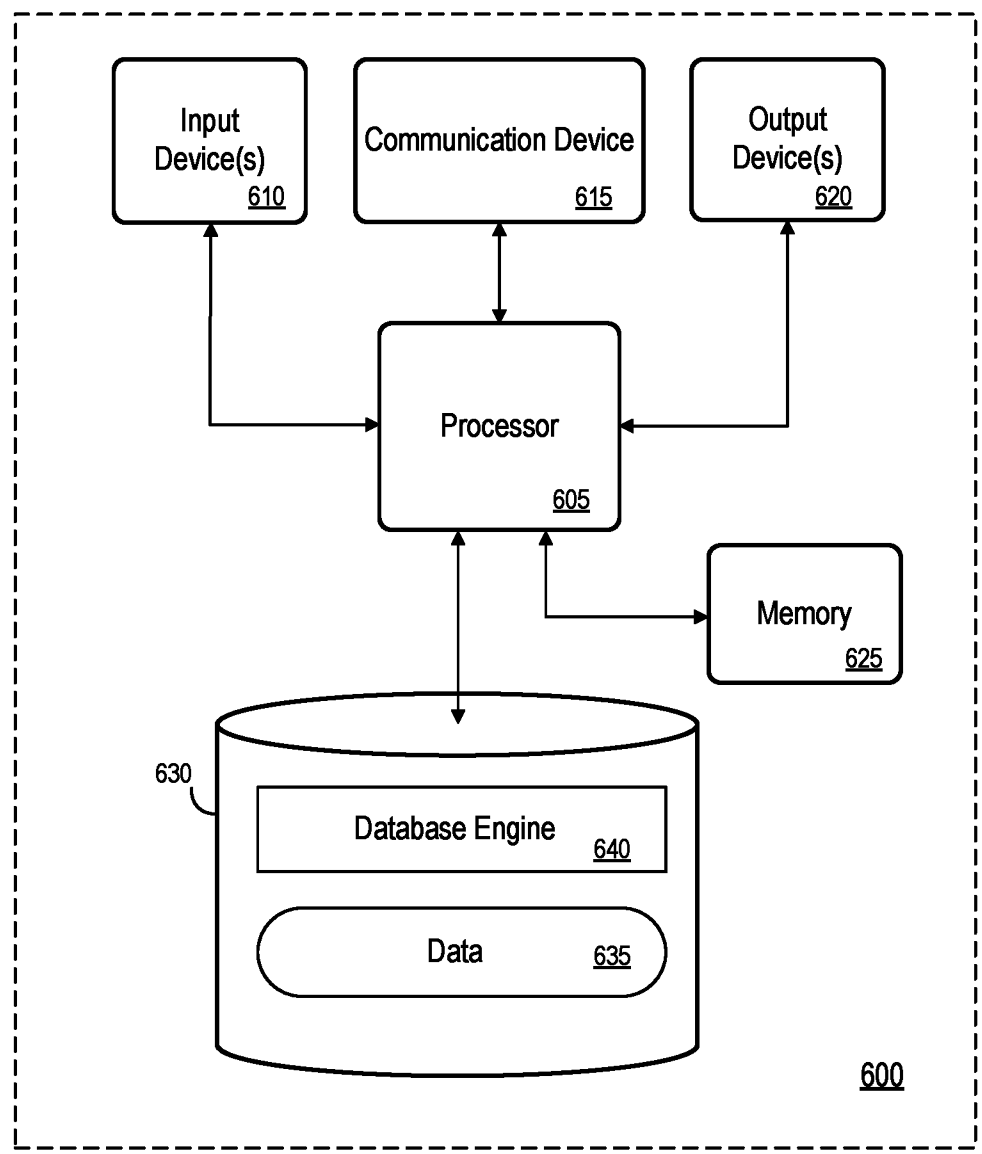
FIG. 6 is a block diagram of an apparatus in an example embodiment.

FIG. 6 is a block diagram of apparatus 600 according to some embodiments. Apparatus 600 may comprise a computing apparatus and may execute program instructions to perform any of the functions described herein. Apparatus 600 may comprise an implementation of a server, a DBMS and a data store, in some embodiments. Apparatus 600 may include other un-shown elements according to some embodiments.

Apparatus 600 includes processor 605 operatively coupled to communication device 620, data storage device 630, one or more input devices 610, one or more output devices 620 and memory 625. Communication device 615 may facilitate communication with external devices, such as a reporting client, or a data storage device. Input device(s) 610 may comprise, for example, a keyboard, a keypad, a mouse or other pointing device, a microphone, knob or a switch, an infra-red (IR) port, a docking station, and/or a touch screen. Input device(s) 610 may be used, for example, to enter information into apparatus 600. Output device(s) 620 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), solid state storages device, optical storage devices, Read Only Memory (ROM) devices, etc., while memory 660 may comprise Random Access Memory (RAM), Storage Class Memory (SCM) or any other fast-access memory.

Database engine 640 may comprise program instructions executed by processor 605 to cause apparatus 600 to perform any one or more of the processes described herein. Embodiments are not limited to execution of these processes by a single apparatus.

Data 635 (either cached or a full database) may be stored in volatile memory such as memory 625. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:

determining, by a processor, a data type for each column of a database table;

determining, by the processor and based on the determined data type for each column of the database table, an indication of a size of the database table;

calculating, by the processor and based on the determined indication of the size of the database table, a start nbit size for a nbit compression process to be used on the database table;

specifying, by the processor, the calculated start nbit size for the nbit compression process; and compressing, by the processor executing the nbit data compression process using the specified start nbit size, the database table.

2. The method of claim 1, further comprising initializing the indication of a size of the database table.

3. The method of claim 1, wherein the indication of the size of the database table is determined based on an aggregate of the determined data type for each of the columns of the database table.

4. The method of claim 1, further comprising specifying a default size for the start nbit size.

5. The method of claim 4, further comprising specifying at least one of an alternate size and a process to determine an alternate size to use instead of the default size for the start nbit size.

6. A system comprising:

a memory storing processor-executable instructions; and a processor to execute the processor-executable instructions to cause the system to:

determine a data type for each column of a database table;

determine, based on the determined data type for each column of the database table, an indication of a size of the database table;

calculate, based on the determined indication of the size of the database table, a start nbit size for a nbit compression process to be used on the database table;

specify, the calculated start nbit size for the nbit compression process; and compress the database table by executing the nbit data compression process using the specified start nbit size.

7. The system of claim 6, further comprising initializing the indication of a size of the database table.

8. The system of claim 6, wherein the indication of the size of the database table is determined based on an aggregate of the determined data type for each of the columns of the database table.

9. The system of claim 6, further comprising specifying a default size for the start nbit size.

10. The system of claim 9, further comprising specifying at least one of an alternate size and a process to determine an alternate size to use instead of the default size for the start nbit size.

11. A non-transitory computer-readable storage medium storing processor executable instructions, the medium comprising:

instructions to determine a data type for each column of a database table;

instructions to determine, based on the determined data type for each column of the database table, an indication of a size of the database table;

instructions to calculate a start nbit size for a nbit compression process to be used on the database table;

instructions to specify the calculated start nbit size for the nbit compression process; and instructions to compress the database table by executing the nbit data compression process using the specified start nbit size.

12. The medium of claim 11, further comprising initializing the indication of a size of the database table.

13. The medium of claim 11, wherein the indication of the size of the database table is determined based on an aggregate of the determined data type for each of the columns of the database table.

14. The medium of claim 11, further comprising specifying a default size for the start nbit size.

15. The medium of claim 14, further comprising specifying at least one of an alternate size and a process to determine an alternate size to use instead of the default size for the start nbit size.

* * * * *